(No Model.) 3 Sheets—Sheet 1.
W. R. COMINGS.
METHOD OF AND MACHINE FOR MAKING CUP SHAPED ARTICLES.
No. 448,748. Patented Mar. 24, 1891.
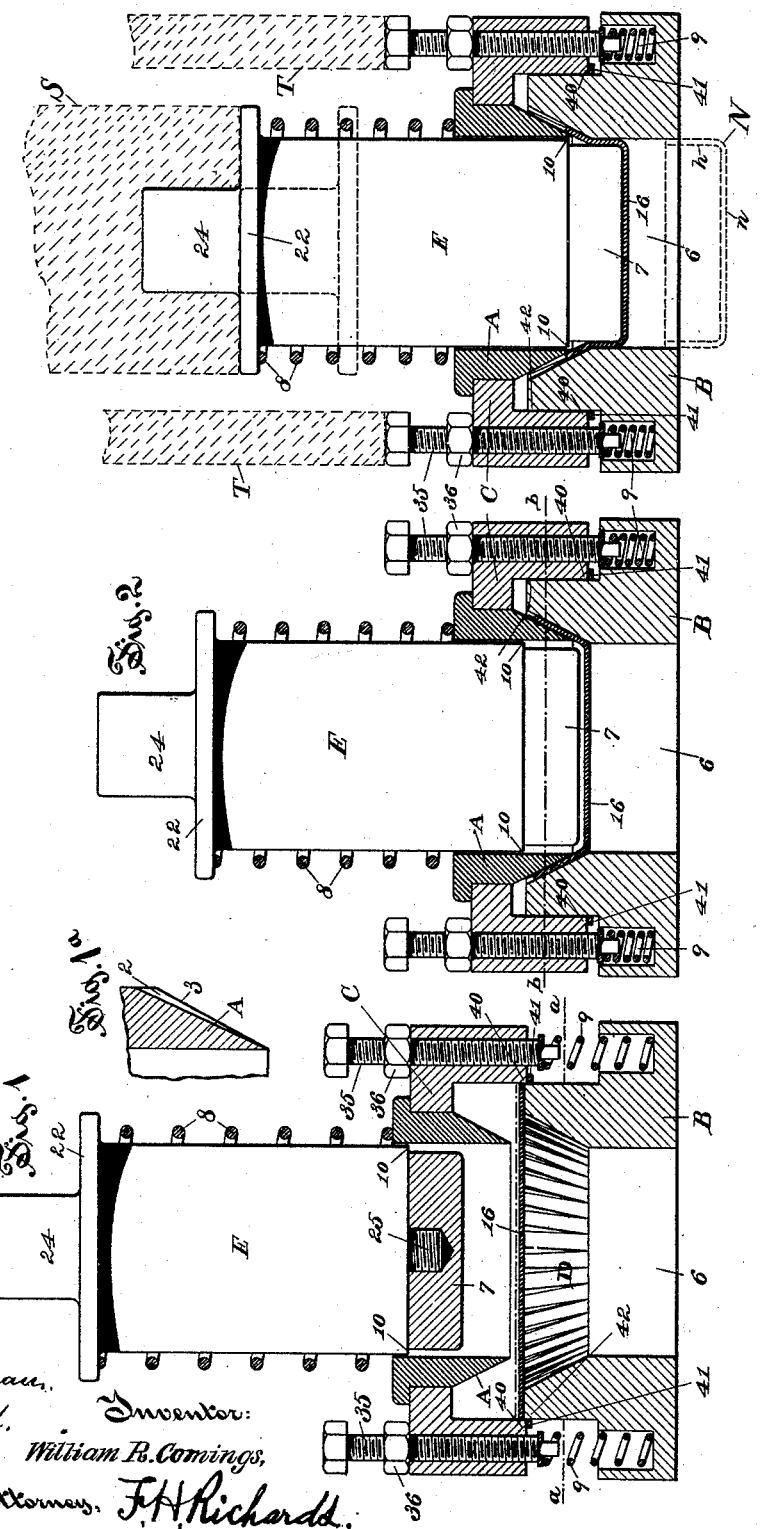
Witnesses:
W. M. Bjorkman.
H. L. Rickard.
Inventor:
William R. Comings,
By his Attorney, F. H. Richards.

(No Model.) 3 Sheets—Sheet 2.

W. R. COMINGS.
METHOD OF AND MACHINE FOR MAKING CUP SHAPED ARTICLES.

No. 448,748. Patented Mar. 24, 1891.

Witnesses:
W. M. Byorkman
H. L. Ruckard

Inventor:
William R. Comings,
By his Attorney,
F. H. Richards (No Model.) 3 Sheets—Sheet 3.
W. R. COMINGS.
METHOD OF AND MACHINE FOR MAKING CUP SHAPED ARTICLES.
No. 448,748. Patented Mar. 24, 1891.
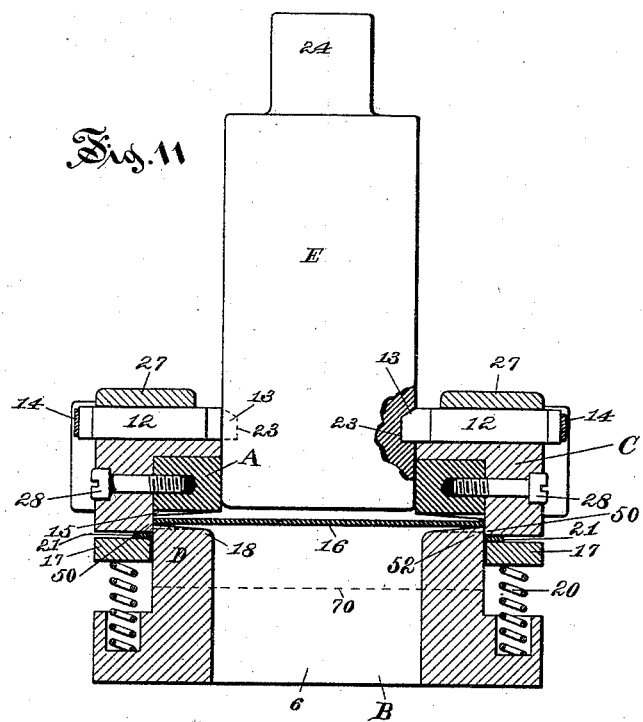
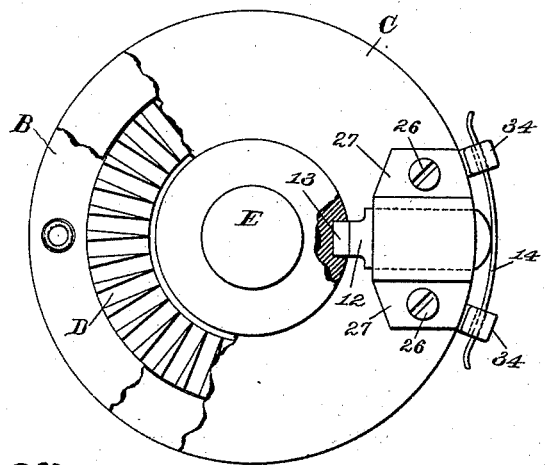
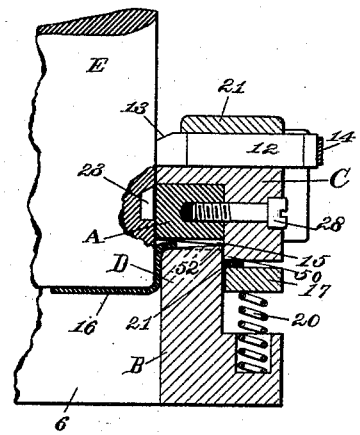
Witnesses:
W. M. Bjorkman.
H. L. Rickard.
Inventor:
William R. Comings,
By his Attorney,
F. H. Richards

UNITED STATES PATENT OFFICE.

WILLIAM R. COMINGS, OF NEW BRITAIN, CONNECTICUT.

METHOD OF AND MACHINE FOR MAKING CUP-SHAPED ARTICLES.

SPECIFICATION forming part of Letters Patent No. 448,748, dated March 24, 1891.

Application filed July 9, 1890. Serial No. 358,213. (No model.) Patented in England November 4, 1887, No. 15,053; in France September 5, 1888, No. 192,804; in Austria-Hungary September 7, 1888, No. 36,934, and in Germany September 15, 1888, No. 47,719.

*To all whom it may concern:*

Be it known that I, WILLIAM RIGHTER COMINGS, a citizen of the United States, residing at New Britain, in the county of Hartford and State of Connecticut, and temporarily of No. 172 St. John street, E. C., London, England, have invented a new and useful Improvement in Methods of and Machines for Making Cup-Shaped Articles, (for which I have obtained a patent in Great Britain, No. 15,053, bearing date November 4, 1887; in France, No. 192,804, dated September 5, 1888; in Austria-Hungary, No. 36, 934, dated September 7, 1888, and in Germany, No. 47,719, dated September 15, 1888,) of which the following is a specification.

This invention relates to methods of and dies for the manufacture of boxes and cup-shaped articles generally of materials in sheet form, and more especially of paper or other fibrous and compressible materials.

My invention has for its object to improve the said manufacture by furnishing methods and means of a character adapted to draw and consolidate the material uniformly throughout the periphery of the blank, thereby securing a better and more desirable article of its kind with the least cost and waste of material.

To this end the invention consists in the methods and the means hereinafter more fully set forth.

Figure 4:
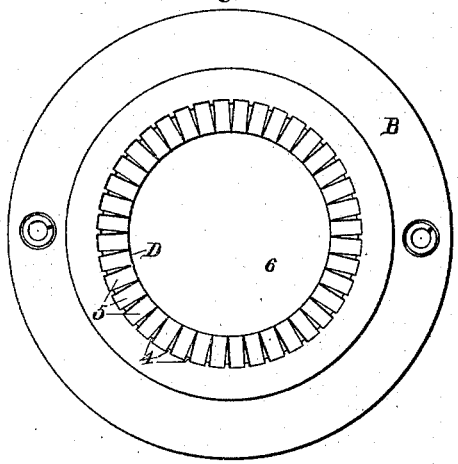
Figure 5:
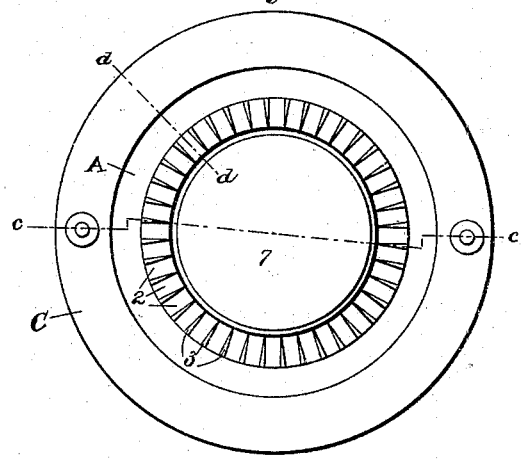
Figure 6:
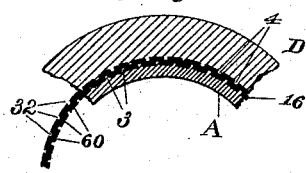
Figure 8:
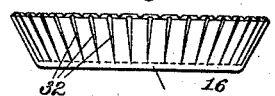
Figure 7:
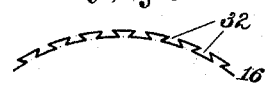
Figure 9:
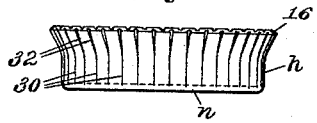
Figure 14:
Figure 10:
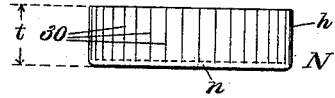
Figure 15:
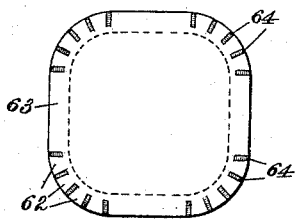

In the drawings accompanying and forming a part of this specification, Figure 1 is a sectional side elevation taken in line *c c*, Fig. 5 of stamping-dies embodying my present invention, showing the blank as if just cut out and the upper plaiting and drawing dies ready to descend onto said blank. Fig. 1ᵃ is a section of the upper plaiting-die in the line *d d*, Fig. 5. Fig. 2 is a similar view showing the upper plaiting-die descended onto the blank and the drawing-die ready to begin its work. Fig. 3 is another similar view showing said plaiting-die continuing to bear upon the blank and said drawing-die partially descended and the box partially formed in the lower drawing-die. Fig. 4 is a plan view of the lower die. Fig. 5 is an inverted plan view of the parts that are above the dotted line *a a* of Fig. 1. Fig. 6 represents portions of the upper and lower plaiting-dies, having between their working-faces a portion of the material being operated upon, the view being taken in line *b b* of Fig. 2. Fig. 7 is a diagrammatic view of a portion of the partially-formed material, showing the form of the plaits. Fig. 8 is a side view of the plaited blank at that stage of the manufacture shown in Fig. 2. Fig. 9 is a similar view of said blanks when the process is further advanced, as in Fig. 3. Fig. 10 is a similar view of the finished article. Fig. 11 is a view similar to Fig. 1 of my improvement constructed with the plaiting-dies flat instead of conical, and showing also certain accessory improvements operating in connection with the movable dies. Fig. 12 is a plan view of the same in which some parts are broken away the better to exhibit the construction and preferred arrangement of the several details. Fig. 13 is a view similar to the right-hand portion of Fig. 11, showing the operation of the devices. Fig. 14 is an enlarged plan view of a portion of the upper edge of a finished article in which the corrugations are extended into plaits, and these are "box-plaited" and consolidated. Fig. 15 shows a blank not circular in form, and in which the corrugations are neither plaited nor cuneiform.

Similar characters designate like parts in all the figures.

The cup-shaped article or "box" of paper, leather, woven or felted fabric, or other fibrous, compressible, or like suitable material adapted to be shaped by the dies is shown in its finished form in Fig. 10, being designated as a whole by the character N. The rim *h* of said box N is of tube form and rises vertically from bottom *n*, and is divided on its surface by a series of lines 30, extending throughout the height thereof. Said lines 30 represent the outer spaces 32, Figs. 6 to 9, inclusive, in the plaited blank 16. The process, therefore, of making said article N according to my invention consists, essentially, in first corrugating or plaiting the rim part of the blank substantially uniformly throughout its periphery, and then drawing and consolidating those corrugations or plaits into tube form to make a smooth rim.

The object of my improved process is to avoid the tearing and straining of the material usually resulting by the old methods, to effect a more rapid production, and also to simplify or lessen the number of the operations through which the material has to be passed.

In carrying out my invention I first by suitable dies shape the paper, leather, or other sheet material into the form, preferably, of a hollow truncated cone, with corrugated ribs running lengthwise of the axis. These corrugations of the blank are preferably on the outer side of uniform width, but wedge-shaped or "cuneiform" in height, diminishing gradually toward the small end of the conical part, where they are reduced substantially to a point and have V-shaped spaces 32. The alternate "corrugations," as seen from the opposite side of the blank, will of course naturally be cuneiform in width also. The height of the plaiting-dies should be only just sufficient to draw the sheet material up from the flat into a conical shape without practically stretching or tearing it. The corrugated conical cup thus formed is next pressed through a die, with a conical plaiting die or surface at the top or mouth thereof and straight at the bottom, the said conical part having its grooves the reverse of the corrugations on the cupped material and the straight part of the hole being smooth. This construction of the plaiting-die leaves a wedge-shaped or cuneiform projecting piece 4, Fig. 4, and 3, Fig. 5, between each of the grooves in said conical portion, which wedges as the material is forced through operate to draw the corrugations together and gradually fold them down into forms resembling box-plaits. Said process of folding down the corrugations changes the shape of the material from a conical corrugated cup, as shown in Fig. 8, to the form of a cup with straight or nearly straight sides and smooth circumference, as shown in Fig. 10, and as said cup is further forced through the lower portion of the straight bore 6, which has smooth sides and a decreasing diameter, the material in the sides of the cup is consolidated, polished, and hardened.

When the depth $t$, Fig. 10, of the cup or box N is considerable relatively to the thickness of the material, the plaits 60, Figs. 6 and 14, are overlapped to a correspondingly greater extent, so that a perfect consolidation of the plaited material requires the same to be suitably treated with a proper adhesive substance, as some albuminous material or glue or the like, according to the nature of the sheet material being used. In the case of paper some kinds have in their composition sufficient glue or like substance, so that under pressure or under pressure and heat combined the corrugations or plaits will firmly unite and become consolidated into a smooth tube or wall. Other kinds of paper require a further preparatory treatment than is involved in their manufacture. When the distance $t$ is comparatively slight, it is not indispensable that the corrugations shall be plaited nor that the corrugations or plaits, as 60 or 62, should be cuneiform; but when said distance $t$ is much increased it is more essential, in order to obtain a satisfactory result, to have the corrugation not only of a plait form, as described, but to have those plaits cuneiform also. By this means the process is made applicable to a greater number of materials and a wider range of sizes. Especially may the cuneiform character of the corrugations or plaits be omitted when the cup-shaped article to be made is not cylindrical, but has straight sides of a shallow depth, as indicated by the drawing of the blank, Fig. 15. In this case the peripheral portion 63 to be shaped is corrugated with the parallel-sided corrugations 64, and if the material be relatively of considerable thickness those corrugations are not box-plaited, but are consolidated in the drawing operation by a species of upsetting and formed into a smooth wall or tube.

In practical working the sheet material may be fed to the dies in the form of a continuous strip, and the cups may be more or less formed before being cut out of the strips, or the blanks may be first cut to the proper size and then fed into the dies one by one. The dies may be made in two or more sets or may be combined in a single set, according as it is desired to produce the work by one or more operations.

The first operation of corrugating should usually, to obtain the best results, (especially with paper of the kinds known as "strawboard,") be so arranged as to take up in the corrugations about one-half that difference in area which exists between the surface of the sides of the finished straight cup and the ring of material, which must be turned and folded up in order to produce the complete cups. This may be readily determined by mathematical calculations or experimentally. In working by this process with fibrous materials, such as sized paper and leather and the like, I sometimes heat the dies or parts of them, and especially the lower drawing-die B, in order to render the material more pliable, and in some cases I treat the material with chemicals, which will soften and strengthen or toughen it, and thus enable it to be more readily worked.

Referring to Figs. 1 to 6, inclusive, B is a combined lower corrugating or plaiting and drawing die, in which the bore 6 is the drawing-die proper, while the corrugated upper portion D, Figs. 1 and 4, constitutes the lower corrugating or plaiting die. In practice I make these two dies integral; but said dies may be made separate and set together in any proper manner, as indicated by the dotted line 70, Fig. 11. Said plaiting-die has its corrugations formed of the grooves and ribs hereinbefore referred to and designated by 5 and 4, respectively. The annular upper plaiting-die A is of a reversely-shaped form and has the corresponding grooves and ribs 2 and 3, respectively, which are set to mesh with those of the lower die D when the dies are closed, as illustrated in Fig. 6.

The plunger E is furnished with a stem 24, whereby it may be held in a press, and is fitted to pass freely through the annular die A. It has on the lower end thereof the upper drawing-die 7, which is shaped to correspond to the required shape and size of the inside of the finished box N. This die 7 is shown formed of a separate piece, which is held onto the plunger E by the screw 25, Fig. 1; but said plunger E and the die 7 may be and often are constructed integral, and hence when referring to the "upper drawing-die" in a general way I designate the same as "the die E" or the "upper drawing-die," thus intending to include the die proper 7 and some plunger or stem therefor. At a proper height on the stem or plunger E, as at 22, I provide a rim or other suitable and well-known abutment or stop for receiving the upward thrust of the spring 8, whose lower end rests on the upper side of the annular die A. This clamping-spring 8 bears down on the die A to clamp the blank 16 with a moderate pressure between the two plaiting-dies during the drawing of the plaited blank from between said dies down through the compressing-bore 6. The power and elasticity of the spring 8 should be graduated to the thickness and character of the material of the blank 16, which graduation is readily accomplished by trial in a well-known manner.

For supporting the die A, I arrange said die to be carried in a lifting-plate C, whose lower edge 40 may also constitute one of the cutting-out dies, the other and corresponding cutting-out die being the outer edge 42 of the plaiting-die D. (See Figs. 1, 2, and 3, where 41 designates the "scrap" from which the blank 16 has been cut out.) For upholding the parts C and A, I have shown as one suitable means therefor the spiral springs 9, which may rest, as shown, in sockets formed in the die B and bear upwardly against the adjusting-screws 35, that pass through the part C and are fixed in place by the check-nuts 36. It will be understood, however, that other well-known forms of springs are equally adapted for said function and that the said adjusting-screws are not always to be used; also, that the plate C may be lifted by any other well-known arrangement of die-lifting devices, especially such as are usually employed for like purposes in other and old combinations in compound dies.

As one suitable means for actuating the movable dies I use the well-known "double-action" press, whose adaptation for the present purpose is illustrated in Fig. 3, where S designates the middle usual slide operated by one crank or cam and carrying the plunger E, while T T designate the usual side slides independently operated by other cranks or cams. The lower corner 10 of the plunger E constitutes a trimming knife or die to cut off smoothly the upper edge of the box-rim just at the conclusion of the forming of said rim, the opposite blade of the "shears" being the upper corner of the bore 6. In Fig. 3 the said edge 10 is shown approaching nearly down to the point for cutting off said edge, after which the finished box N is left at the position shown by dotted lines in said Fig. 3.

In the modification shown in Figs. 11, 12, and 13 the spring 8 is not necessarily used, and appliances are shown for operating the cutting-out dies and the plaiting-dies from the upper drawing-die; also, the plaiting-dies are here shown flat instead of conical. The plaiting-die carrier C, as in the preceding figures, has on it the upper cutting-out die 50, which coacts with the lower cutting-out die 52 to cut out the blank 16. Surrounding the lower plaiting-die D, I provide a clearer-ring 17, upheld by suitable springs, as 20, which ring, on the rising of the upper dies, raises the scrap 21 from the die D, ready to be removed by the operator or by some well-known automatic devices. (Not shown.) The upper plaiting-die A is here shown in the form of a plain ring (except on the lower side thereof) fastened to the part C by the screws 28. In the sides of die E there are formed detent-notches 23, engaging with the points 13 13 of the yielding bolts or latches 12 12, which are carried on the upper side of said part C, being held thereon by some suitable means, as caps 27 27 and screws 26. Said latches are forcibly driven toward the stem E by suitable springs—as, for instance, the springs 14 14, carried by the supports 34.

As shown in Figs. 11 and 13, the catches 12 12 are slightly inclined on their upper side and at their inner ends and fit against the similarly-shaped upper surfaces of the notches 23. With this construction the pressure exerted by die A will depend upon the angle of the incline at 13, (plus, of course, the resistance due to the action of spring 14,) and when sufficient pressure is thus exerted the plunger E will force back latches 12 12, the inner ends of which will be firmly pressed by said spring 14 against the side of said plunger, so that the two will rise together until die A is suitably stopped in its upward travel, the plunger E continuing to rise until the latches 12 12 engage therewith for the next stroke.

The plaiting-dies shown in Figs. 11, 12, and 13 are provided with wedge-shaped projections or ribs 15 similar to the ribs 2 of the conical dies, and these press the material so as to form the requisite corrugating lines or scores therein in substantially the manner hereinbefore fully set forth. The plunger E descending and forcing the material through the smooth vertical part 6 of the die D, the die A preferably rising sufficiently to allow this to be readily done, the corrugated or plaited periphery of the blank is drawn into a rim, substantially as described in connection with the preceding figures. This operation, as will be seen, is illustrated in Fig. 13, which corresponds substantially with Fig. 3.

It will of course be evident that my improved process may be carried into effect by separate operations by using separate dies, first corrugating the blank and then drawing the same; but such procedure will be easily understood from the above description. It will also be evident that instead of cups of cylindrical shape by properly shaping the dies cups of any desired cross-sectional shape can be readily produced.

Having thus described my invention, I claim—

1. The method of forming cup-shaped articles of material in sheet form, which consists in corrugating by plaiting the portion to be shaped and drawing the plaited portion into tube form, substantially as described.

2. The method of forming cup-shaped articles of material in sheet form, which consists in corrugating by box-plaiting the portion to be shaped and drawing the box-plaited portion into tube form, substantially as described.

3. The method of forming cup-shaped articles of paper, which consists in corrugating by plaiting the portion to be shaped and drawing the plaited portion to consolidate the same, substantially as described.

4. The method of forming cup-shaped articles of paper, which consists in first treating the paper with adhesive substance, next corrugating by plaiting the treated portion to be shaped, and drawing the treated and plaited portion to be shaped under the action of heat to consolidate the same, substantially as described.

5. In mechanism for forming cup-shaped articles, the combination, with lower and upper drawing-dies, of the lower and upper corrugating-dies surrounding the drawing-dies and having interlocking plait-forming corrugations, substantially as described.

6. In mechanism for forming cup-shaped articles, the combination, with lower and upper drawing-dies, of the conical upper and lower corrugating-dies surrounding said drawing-dies and having interlocking plait forming corrugations, substantially as described.

7. In mechanism for forming cup-shaped articles, the combination, with upper and lower drawing-dies, of the upper and lower corrugating-dies surrounding said drawing-dies and having interlocking plait-forming corrugations, the ribs of said corrugations being cuneiform and the corresponding grooves of substantially uniform width throughout the length thereof, substantially as described.

8. In mechanism for forming cup-shaped articles, the combination, with drawing-dies, of the corrugating-dies surrounding the drawing-dies, and cutting-out dies surrounding the corrugating-dies, whereby the blank is successively cut out, corrugated, and drawn, substantially as described.

9. In mechanism for forming cup-shaped articles, the combination, with drawing-dies, of corrugating-dies surrounding the drawing-dies, cutting-out dies surrounding the corrugating-dies, and a lifting-plate, substantially as described, coacting with the outer cutting-die, substantially as described.

10. In mechanism for forming cup-shaped articles, the combination, with the upper and lower drawing-dies and with the upper and lower corrugating-dies, of the cutting-out dies surrounding the corrugating-dies, the upper corrugating-die being movably supported in the upper cutting-out die, whereby the same is positively lifted, and means, substantially as described, acting between the upper drawing-die and said upper corrugating-die to force down said corrugating-die on the descent of said drawing-die.

11. In mechanism for forming cup-shaped articles, the combination, with the drawing-dies and the surrounding corrugating-dies, of the spring-actuated latches operating the upper corrugating-die from the drawing-die by engagement therewith, substantially as described.

12. In mechanism for forming cup-shaped articles, the combination, with the drawing-dies and with the surrounding corrugating-dies, of the cutting-out dies surrounding the corrugating-dies, and spring-actuated latches operating the cutting-out dies by engaging the drawing-dies, substantially as described.

WILLIAM R. COMINGS.

Witnesses:
A. GIBBONS,
ADDISON A. RIGHTER.